(12) United States Patent
Frost

(10) Patent No.: US 6,880,469 B2
(45) Date of Patent: Apr. 19, 2005

(54) JOURNAL BEARING FOR TROLLEY WHEEL

(75) Inventor: Charles C. Frost, Ada, MI (US)

(73) Assignee: Frost Inc., Grand Rapids, MI (US)

( * ) Notice: Subject to any disclaimer, the term of this patent is extended or adjusted under 35 U.S.C. 154(b) by 0 days.

(21) Appl. No.: 10/723,970

(22) Filed: Nov. 26, 2003

(65) Prior Publication Data

US 2004/0109621 A1 Jun. 10, 2004

Related U.S. Application Data

(60) Provisional application No. 60/429,361, filed on Nov. 26, 2002.

(51) Int. Cl.[7] ............................ B61B 11/00; B60B 17/00
(52) U.S. Cl. .......................................... 105/154; 295/35
(58) Field of Search ................................. 105/148, 154, 105/155; 104/89, 94; 295/35

(56) References Cited

U.S. PATENT DOCUMENTS 4,993,328 A  *  2/1991  Wendt et al. ................ 105/150
5,156,533 A  *  10/1992 Hoffman et al. ............ 105/148
5,398,618 A  *  3/1995  McMullen .................... 105/148
6,241,082 B1  *  6/2001  Vanmeenen et al. ........ 198/845

* cited by examiner

Primary Examiner—S. Joseph Morano
Assistant Examiner—Robert J. McCarry, Jr.
(74) Attorney, Agent, or Firm—Van Dyke, Gardner, Linn & Burkhart, LLP

(57) ABSTRACT

A trolley wheel assembly includes a wheel portion rotatably positioned around a hub portion and at least one sliding member positioned between the wheel portion and the hub portion. The sliding member defines a mating surface for mating with a generally correspondingly formed mating surface of the wheel portion and/or the hub portion. The mating surface of the sliding member defines a radial projection at least substantially circumferentially around the sliding member. The radial projection may slidably mate with the generally correspondingly formed mating surface of the wheel portion and/or the hub portion to facilitate rotation of the wheel portion about the hub portion. The wheel assembly may include one or more inserts that define the correspondingly formed mating surface and that are positioned between the sliding member and the wheel or hub portion to facilitate manufacturing and assembly of the wheel assembly.

38 Claims, 6 Drawing Sheets

JOURNAL BEARING FOR TROLLEY WHEEL

CROSS REFERENCE TO RELATED APPLICATION

The present application claims benefit of U.S. provisional application Ser. No. 60/429,361, filed Nov. 26, 2002 by Frost for LOW FRICTION JOURNAL BEARING FOR TROLLEY WHEEL, which is hereby incorporated herein by reference in its entirety.

FIELD OF THE INVENTION

The present invention relates generally to trolley wheel assemblies and, more particularly, to a wheel assembly for a trolley that is suitable for use in adverse environments.

BACKGROUND OF THE INVENTION

Conveyor trolleys typically have bearings between the wheel and the hub of each trolley wheel assembly to allow for smooth, generally low friction rolling of the wheel relative to the hub and trolley arm. However, the bearings typically require lubrication and may contaminate various paint processes if the oils or lubricants bleed or leak or drip from the bearings as the wheel assembly and trolley travel through the paint processes. Also, pre-paint cleaning operations and the like typically use highly caustic materials or solutions which may breakdown the lubricants in the bearings, resulting in premature failure of the bearings.

Conventional journal bearings may be implemented to avoid the concerns with typical roller bearings. However, such journal bearings are typically high friction assemblies and thus do not provide for a smooth, low friction rolling of the wheel along the conveyor system. Because the journal bearings do not include roller bearings and may have a high friction interface between the wheel and the hub, such journal bearings often require lubricant to provide smooth rotation of the wheels about the hubs.

Therefore, there is a need in the art for a trolley wheel assembly which overcomes the shortcomings of the prior art.

SUMMARY OF THE INVENTION

The present invention is intended to provide a bearingless trolley wheel assembly which provides for low friction rolling of the trolley wheel about a hub and which can withstand high temperatures and caustic cleaning chemicals and the like, so as to be suitable for use in adverse environments. The bearingless wheel assembly also may not require lubricants and, thus, may not contaminate paint processes and the like during use.

According to an aspect of the present invention, a trolley wheel assembly for a conveyor trolley comprises a wheel portion rotatably positioned around a hub portion, and at least one sliding member positioned between the wheel portion and the hub portion. The sliding member defines at least one mating surface for mating with a generally correspondingly formed mating surface of at least one of the wheel portion and the hub portion. The mating surface of the sliding member defines a radial projection or protrusion at least substantially circumferentially around the sliding member. The radial projection slidably mates with the generally correspondingly formed mating surface of the wheel portion and/or hub portion to facilitate rotation of the wheel portion about the hub portion.

The radial projection may comprise a curved radial projection which mates with a correspondingly curved mating surface of the wheel portion and/or hub portion. The sliding member and the wheel portion and/or hub portion are generally correspondingly formed to maintain axial alignment of the sliding member and the wheel portion and/or hub portion.

The wheel portion and/or hub portion may comprise at least one insert portion, which defines the correspondingly formed mating surface of the wheel portion and/or hub portion. One of the sliding member and the insert member may comprise a plastic or polymeric material, while the other of the sliding member and insert member may comprise a metallic material and may have a low friction coating thereon.

According to another aspect of the present invention, a trolley wheel assembly for a conveyor trolley comprises a wheel portion rotatably positioned around a hub portion, and at least one sliding member positioned therebetween. The sliding member provides a low coefficient of friction interface between the sliding member and the wheel portion and/or the hub portion. The sliding member may have a generally circular or otherwise rounded or curved cross sectional portion or uneven or radially protruding portion for engaging a generally correspondingly formed portion of another sliding member and/or the hub portion and/or the wheel portion to axially retain the wheel assembly together and to maintain smooth performance under axial loading and/or radial loading of the wheel assembly.

The sliding member or members may comprise any suitably durable and low friction material, such as a metallic material, a polymeric or plastic material, such as an engineered thermoplastic material or the like, a ceramic material, a fluorocarbon material and/or the like, without affecting the scope of the present invention.

In one form, the sliding members of the wheel assembly comprise a polymeric sliding member and a metallic sliding member positioned between the polymeric sliding member and the wheel or hub portion. The polymeric and metallic sliding members may be correspondingly formed with generally circular or otherwise rounded or curved longitudinal cross sections, such that a rounded portion of one of the sliding members engages a correspondingly formed rounded groove or channel in the other sliding member. The metallic sliding member may be coated with a low coefficient of friction or slick coating, such as a diamond like coating or the like, to enhance sliding movement of the metallic sliding member relative to the polymeric sliding member and/or the hub portion and/or the wheel portion of the wheel assembly.

According to another aspect of the present invention, a trolley wheel assembly for a conveyor trolley comprises a wheel portion rotatably positioned around a hub portion, and a sliding assembly positioned between the wheel portion and the hub portion. The sliding assembly comprises first and second sliding members which slidably engage one another as the wheel portion rotates about the hub portion. The sliding members define an annular sliding interface therebetween and are correspondingly formed at the sliding interface to define a rounded or curved or axially uneven sliding interface to limit axial movement between the sliding members when the wheel portion is rotated about the hub portion.

At least one of the sliding members may have a rounded or curved cross sectional portion protruding radially outwardly or inwardly and engaging a correspondingly formed portion or groove or channel of the other sliding member and/or the hub portion and/or the wheel portion to retain the wheel assembly together and to maintain axial alignment of the sliding members and of the wheel portion and hub portion and, thus, to maintain smooth performance under axial thrust or loading and/or radial loading of the wheel assembly.

Optionally, one of the sliding members of the sliding assembly may be coated with a low coefficient of friction or slick coating, such as a diamond like coating (DLC) or the like, to enhance sliding movement of the portions relative to one another and/or to the wheel portion or hub portion, and, thus, to enhance rotation of the wheel portion about the hub portion.

One of the sliding members may comprise a plastic or polymeric material, while the other sliding member or the wheel or hub portion may comprise a metallic material. In one form, the plastic sliding member may comprise an inner polymeric portion and an outer polymeric portion, whereby the inner polymeric portion may be positioned adjacent to and in engagement with the hub portion, while the outer polymeric portion is positioned adjacent to and in engagement with the wheel portion. A metallic sliding member may comprise a metallic ring or the like, such as a generally toroidal-shaped ring or partial toroidal-shaped ring or the like, and may be positioned between the inner and outer polymeric sliding members and in slidable engagement therewith.

In another form, the polymeric sliding member may be positioned adjacent to the hub portion and the metallic sliding member may be positioned adjacent to the wheel portion and in slidable engagement with the polymeric sliding member to facilitate rotation of the wheel portion about the hub portion. Alternately, the metallic sliding member may be positioned adjacent to the hub portion and the polymeric sliding member may be positioned adjacent to the wheel portion and in slidable engagement with the metallic sliding member to facilitate rotation of the wheel portion about the hub portion. Other arrangements of plastic or polymeric and/or metallic (or other suitable materials) sliding members may be implemented, without affecting the scope of the present invention.

In another form, the sliding members may both comprise a metallic material or may both comprise a polymeric material or the like. Other suitable materials may be used for either or both sliding members of the sliding assembly, such as ceramic materials, fluorocarbon materials and/or the like, which are sufficiently durable and which provide wear or sliding interface surfaces with a sufficiently low coefficient of friction, without affecting the scope of the present invention. Optionally, one or more of the sliding members may comprise an engineered thermoplastic material or the like which provides a low coefficient of friction wear surface between the sliding members and/or the sliding member and the wheel portion or hub portion of the wheel assembly.

Therefore, the present invention provides a bearingless trolley wheel assembly which provides enhanced rotation of the wheel portion relative to the hub portion of the wheel assembly, without requiring bearings or lubricants. The plastic and/or metal sliding member or members of the wheel assembly provide smooth sliding engagement with one another to provide smooth rotation of the wheel portion about the hub portion. The low coefficient of friction selected material of the sliding member or members may further enhance the sliding between the components, while a low coefficient of friction coating may be provided to also enhance the sliding engagement. The sliding members are correspondingly formed with one another or with the hub portion or the wheel portion of the wheel assembly. The sliding member or members defines a radial protrusion or axially uneven or longitudinally uneven or curved mating surface, such as a generally circular or partially circular or otherwise curved or uneven cross section or mating surface, for engagement within and along a correspondingly formed channel or groove or uneven mating surface of another sliding member or of the hub portion or of the wheel portion, to maintain alignment of the wheel portion with the hub portion and to provide smooth rotation of the wheel portion about the hub portion.

These and other objects, advantages, purposes and features of the present invention will become apparent upon review of the following specification in conjunction with the drawings.

DESCRIPTION OF THE PREFERRED EMBODIMENTS

Figure 2:
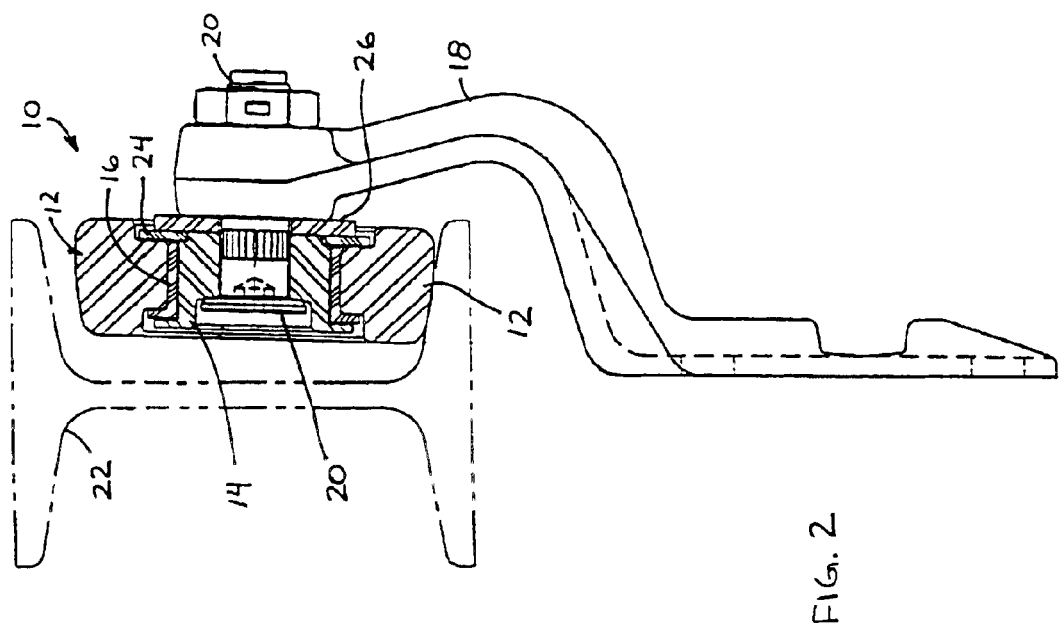
FIG. 2 is an end elevation and partial sectional view of the trolley wheel assembly of FIG. 1, as assembled to a trolley arm movable along a beam of a conveyor assembly.
Figure 1:
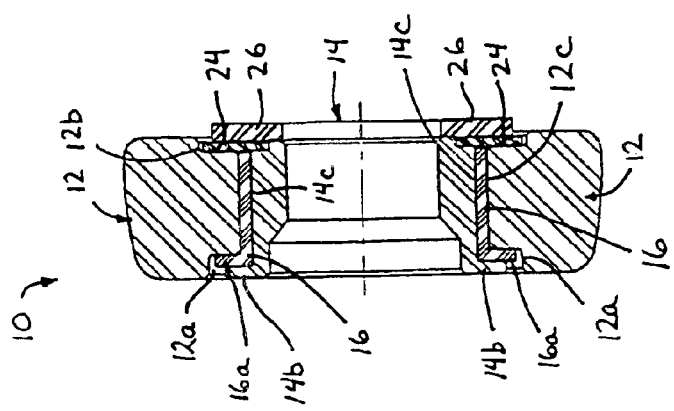
FIG. 1 is a centerline sectional view of a trolley wheel assembly in accordance with the present invention.

Referring now to the drawings and the illustrative embodiments depicted therein, a trolley wheel assembly 10 comprises a metal wheel portion 12, a metal or steel hub portion 14 and a plastic journal bearing member 16 positioned or sandwiched between the wheel portion 12 and hub portion 14 (FIGS. 1 and 2). The plastic journal bearing 16 comprises an engineered thermoplastic, low friction compound or material, which provides for smooth, low friction rolling of wheel portion 12 relative to hub portion 14 of wheel assembly 10.

Figure 3:
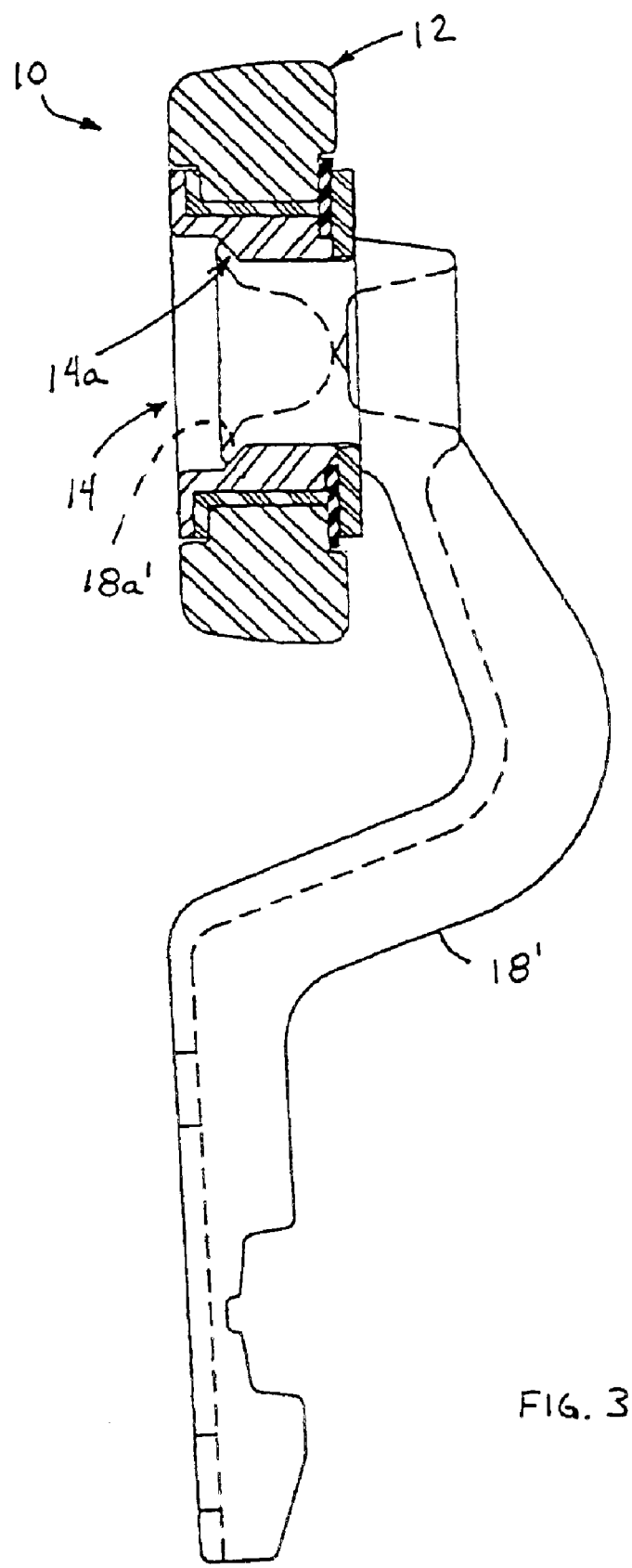
FIG. 3 is another end elevation and partial sectional view of a trolley wheel assembly similar to the wheel assembly of FIGS. 1 and 2, as mounted to another trolley arm.

As shown in FIG. 2, wheel assembly 10 may be part of a bolt-on wheel and trolley construction, where the wheel assembly 10 is bolted to a trolley arm 18 via a bolt 20 or other fastener. The hub portion 14 is thus secured to the arm portion 18, whereby wheel portion 12 rotates about hub portion 14 as the wheel assembly 10 and arm 18 travels along an I-beam 22 or the like of a trolley conveyor system. Optionally, as shown in FIG. 3, the wheel assembly of the present invention may be part of a swaged wheel to trolley construction, where the trolley arm 18' is secured to the hub portion 14 via a flared portion 18a' engaging a correspondingly formed region 14a of hub portion 14. Other means of connecting the wheel assembly to a trolley arm may be implemented, without affecting the scope of the present invention.

Plastic journal bearing 16 comprises a polymeric material, such as an engineered thermoplastic compound formed by use of a thermoplastic base to which composite fibers and solid lubricants are alloyed. The plastic material is resistant to alkalis and most organic and inorganic solutions, so that it is able to withstand contact with caustic cleaning solutions and the like. The bearing material may have a temperature rating of approximately −40° F. to 200° F. continuously, with intermittent capabilities of up to approximately 250° F. or more. Optionally, the material may be selected to be capable of higher temperatures, such as a material capable of more than approximately 450° F. The plastic bearing material thus provides for low friction sliding contact between the metal wheel portion 12 and the journal bearing 16 and/or between the metal hub portion 14 and the journal bearing 16 to provide for smooth rotation of wheel portion 12 about hub portion 14 of wheel assembly 10. The plastic bearing material may also be capable of withstanding various adverse environments which the trolley wheel assembly may be subjected to, depending on the application of the particular trolley and trolley conveyor assembly.

Wheel assembly 10 further includes a plastic thrust bearing 24 and a steel or metal washer 26 which function to retain the metal wheel portion 12 in alignment with the hub portion 14. As can be seen in FIG. 1, hub portion 14 includes a radially outwardly extending flange or ring 14b, while wheel portion 12 includes a recessed area 12a for receiving a flared ring portion 16a of plastic journal bearing 16 between wheel portion 12 and ring 14b of hub portion 14. Wheel portion 12 also includes another recess 12b opposite recess 12a for receiving the thrust bearing 24 therein, which presses wheel portion 12 and plastic journal bearing 16 toward flange or ring 14b of hub portion 14 to retain the components together. The washer 26 then presses against hub portion 14 and thrust bearing 24 to further retain all the components around hub portion 14.

Optionally, wheel portion 12 and hub portion 14 may comprise metallic components and may be coated with a low friction coating or the like to provide a low coefficient of friction surface of the components, at least at the mating or wear surfaces 12c, 14c which may movably engage the plastic journal bearing 16 as wheel portion 12 rotates about hub portion 14. For example, the hub and wheel portions may be treated with a Teflon type material or a hard carbon or diamond like coating (DLC) or material, or any other durable and low coefficient of friction material or slick material, without affecting the scope of the present invention. The low friction coating may comprise a durable, low friction type of coating or surface, such as a DLC coating, such as is known for use on drill bits, tabs and other cutting tools or the like. Such a low coefficient of friction plastic material and/or a low coefficient of friction coating on the mating wear surfaces enhances the relative movability between the components and reduces the wear on the components during use. The low coefficient of friction surfaces and/or coatings also reduces the likelihood that any liquid lubricants, such as oil or grease or the like, will be necessary between the components to maintain the wheel portion 12 smoothly rotating about hub portion 14.

Figure 4:
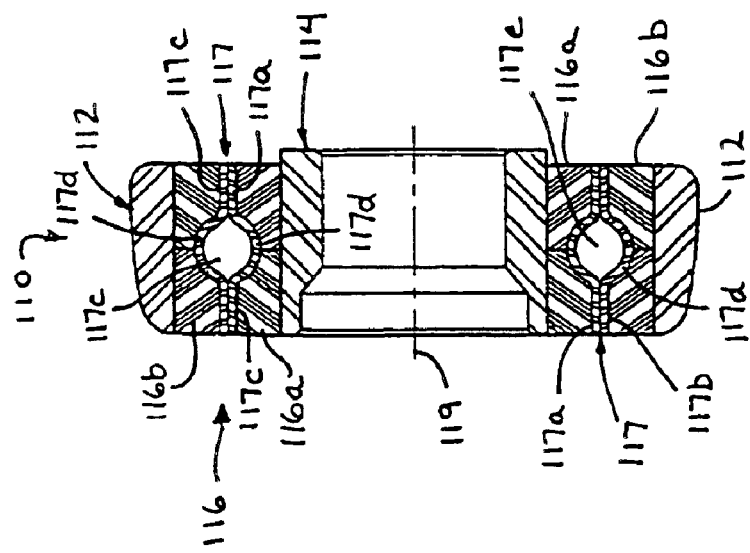
FIG. 4 is a centerline sectional view of another trolley wheel assembly in accordance with the present invention.
Figure 4A:
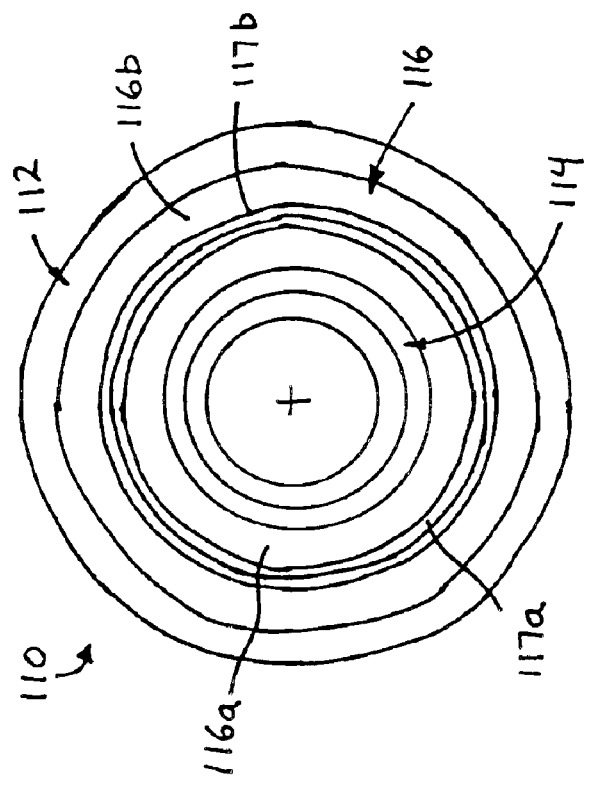
FIG. 4A is an end elevation of the trolley wheel assembly of FIG. 4.

Referring now to FIGS. 4 and 4A, a trolley wheel assembly 110 in accordance with the present invention includes an outer metal or steel wheel portion 112, a metal or steel hub portion 114 and a sliding assembly or journal bearing assembly 116 positioned and sandwiched between wheel portion 112 and hub portion 114. The journal bearing assembly 116 includes an inner insert or sliding member 116a, an outer insert or sliding member 116b and an insert or portion or sliding member 117 positioned or sandwiched between the inner and outer inserts 116a, 116b. In the illustrated embodiment, the inner and outer inserts 116a, 116b comprise a plastic or polymeric material, while the sliding member 117 comprises a metallic material.

As seen in FIG. 4, the sliding member 117 includes a pair of oppositely curved metal plates or rings 117a, 117b, which may be secured together and which define mating surfaces 117c which have raised portions or radial protrusions or radially protruding portions 117d which define a ring-shaped insert or portion having a generally circular or rounded or curved cross section (as seen in FIG. 4, the curved or rounded cross section is taken axially or longitudinally along a center-line or axis 119 of the wheel assembly, whereby the curved or uneven portions are defined by the mating surface having varying radii therealong). The oppositely curved radial protrusions or portions 117d of the sliding member 117 define a hollow ring portion 117e with an opening therein. The radially raised or protruding portions 117d of rings 117a, 117b extend or protrude radially outwardly and inwardly and engage correspondingly formed mating surfaces of inserts 116a, 116b, and fit within correspondingly formed annular recesses or grooves or radial protrusions or indents circumferentially around the plastic insert portions 116a, 116b. As can be seen in FIG. 4, the rings 117a, 117b may be defined by varied radii longitudinally along the rings 117a, 117b, such that the radial protrusions 117d are defined by a greater or lesser radius than the opposite ends of the rings 117a, 117b. The inserts 116a, 116b likewise are defined by varied radii therealong to define a mating surface which generally corresponds with the mating surface of the rings 117a, 117b. The engagement or sliding interface of the mating surfaces 117c and oppositely curved portions 117d of the sliding portions 117a, 117b with the inner and outer inserts 116a, 116b functions to axially retain the outer insert portion 116b and wheel portion 112 relative to the inner plastic insert portion 116a and hub portion 114 and to provide smooth operation of the wheel assembly.

The inserts 116a and 116b may be secured, adhered or bonded or otherwise affixed to the respective hub portion 114 and wheel portion 112, respectively, while the ring portions 117a, 117b slidably engage the respective plastic inserts 116a, 116b along a sliding interface to facilitate rotation of wheel portion 112 about hub portion 114. As can be seen in FIG. 4, one or both of the inserts 116a, 116b may comprise a two piece insert assembly having opposite end portions or rings at or toward opposite ends of the wheel assembly. The two piece construction of the insert portion or portions 116a, 116b facilitates easy assembly of the sliding assembly or journal bearing assembly 116 around the hub portion and between the hub portion and wheel portion of the wheel assembly. For example, one of the end portions of each insert may be positioned at the respective wheel and hub portion and the wheel portion may be positioned around the hub portion. The sliding portions 117a, 117b may then be positioned between the end portions with the radially protruding portion within the semi-circular recess defined by the end portions of the inserts. The other end portions of the inserts 116a, 116b may be positioned adjacent to the first end portions and may be secured to or adhered to or pressed against or otherwise positioned at the wheel or hub portion to retain the sliding members 117a, 117b in position between the wheel and hub portions.

Optionally, the sliding portions 117a, 117b may comprise a metallic material and may be coated (at least on their mating surfaces 117c for engaging or mating with the inserts 116a, 116b) with a low friction coating or the like, similar to the low friction coating described above with respect to wheel assembly 10. Optionally, the portions or inserts 116a, 116b may comprise a low coefficient of friction thermoplastic material, such as discussed above with respect to journal bearing 16. Although shown and described as comprising a metallic material, such as steel, bronze or any other suitable metallic material, the sliding insert or portion 117 may comprise other suitable materials, such as polymeric materials, ceramic materials, fluorocarbon materials and/or the like, which are sufficiently durable and which provide sufficiently low friction surfaces, without affecting the scope of the present invention. Likewise, although shown and described as comprising a plastic material, the inserts or portions 116a, 116b may comprise other suitable materials, such as metallic materials (and may be coated or treated with a low coefficient coating or the like), ceramic materials, fluorocarbon materials and/or the like, which are sufficiently durable and which provide sufficiently low friction surfaces, without affecting the scope of the present invention.

The mating engagement or sliding interface of the rounded or curved or otherwise radially protruding rings and generally correspondingly formed inserts functions to maintain alignment of the wheel portion on the hub portion during radial loading and/or axial thrust or loading of the wheel assembly. The longitudinally curved or uneven mating engagement of the sliding assembly or journal bearing assembly may provide smooth performance without binding of the components during operation of the wheel assembly. The journal bearing assembly 116 thus may provide for smooth operation of the wheel assembly 110 during loading conditions without requiring lubricant. The wheel assembly 110 also may obviate the need for thrust washers and the like.

Figure 5:
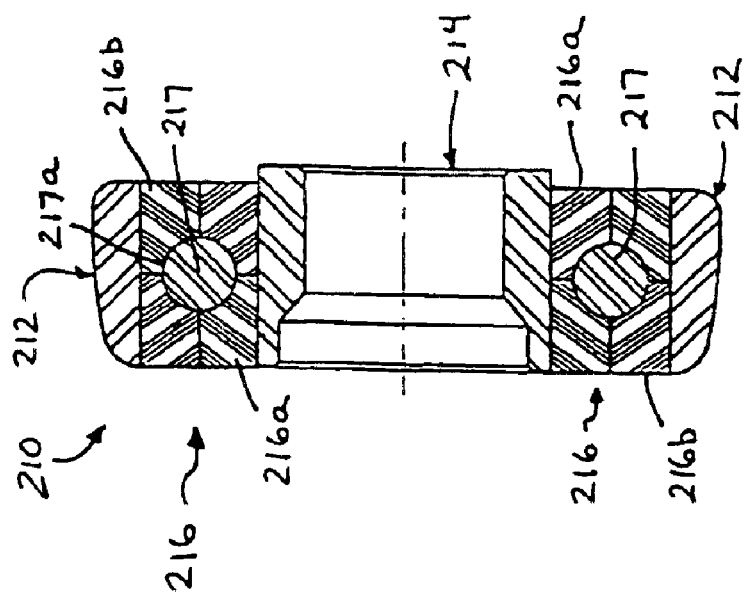
FIG. 5 is a centerline sectional view of another trolley wheel assembly in accordance with the present invention.

With reference to FIG. 5, another wheel assembly 210 in accordance with the present invention is shown which includes a metallic or steel wheel portion 212, a metallic or steel hub portion 214 and a journal bearing assembly or insert or sliding member 216 sandwiched between the wheel portion 212 and hub portion 214. Similar to wheel assembly 110, journal bearing assembly 216 of wheel assembly 210 includes a sliding member or insert portion or ring 217 positioned between inner and outer insert portions 216a, 216b.

Sliding member 217 comprises a generally toroidal-shaped ring which has a generally circular or rounded cross section and defines a radially protruding mating surface 217a which engages or mates or fits within correspondingly formed recesses or grooves or channels defined circumferentially around and between the inner and outer insert portions 216a, 216b. However, the ring portions or members may comprise other shaped rings having different cross sectional forms, such as a partial circular form or an oval form or other longitudinally curved or rounded or non-flat or uneven form having at least one radial protrusion or radially protruding or extending portion, with the insert portions being correspondingly formed to generally uniformly engage the ring portion, without affecting the scope of the present invention. The sliding member or ring portion 217 may comprise a metallic material and may be coated with a low friction coating (such as discussed above) and slidably engages the inserts 216a, 216b, which may comprise a plastic or polymeric or thermoplastic material (such as also discussed above). The inserts or insert portions 216a, 216b may be generally fixedly secured to the hub and wheel portions 214, 212, respectively. Optionally, the insert portions 216a, 216b may comprise a low coefficient of friction thermoplastic material, such as discussed above. Optionally, the insert and/or ring portions may comprise a metallic material, a plastic or polymeric material or other suitable materials, such as discussed above, without affecting the scope of the present invention.

For ease of manufacturing of wheel assembly 210, the inner and outer insert portions 216a, 216b may each comprise two end portions, such that one side or end of the two plastic inserts may be assembled together, with the other side being assembled after the sliding member or insert 217 is positioned around and within the journal bearing assembly 216 and wheel assembly 210.

Figure 6:
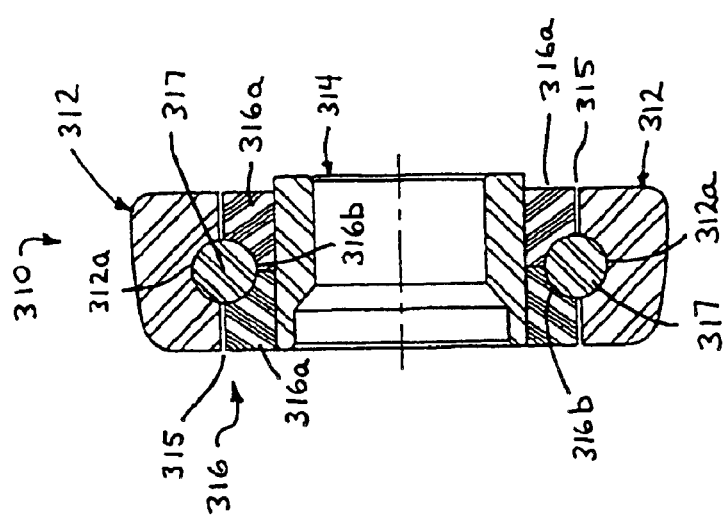
FIG. 6 is a centerline sectional view of another trolley wheel assembly in accordance with the present invention.

Referring now to FIG. 6, another trolley wheel assembly 310 in accordance with the present invention includes a metal or steel wheel portion 312, a metal or steel hub portion 314 and a journal bearing assembly or device 316 positioned or sandwiched between the wheel portion 312 and hub portion 314. Journal bearing assembly 316 includes an inner ring insert or portion or sliding member 316a positioned around hub portion 314 (or a pair of rings or ring portions positioned around the hub portion, in order to ease assembly of the wheel assembly, such as discussed above). Ring portion 316a defines a groove or recess or radial protrusion or indent 316b circumferentially therearound. A generally toroidal-shaped metallic ring or sliding member 317 having a generally circular or rounded cross section is positioned within the groove 316b along the ring or rings 316a and is also received within a correspondingly formed groove or radially protruding portion 312a of wheel portion 312 that extends circumferentially around an inner surface area or mating surface of the wheel portion 312, so as to retain the wheel portion 312 about the journal bearing assembly 316 and hub portion 314 of wheel assembly 310. The sliding member or ring 317 and grooves 312a and 316b may be sized so that a gap 315 exists between plastic ring 316a and wheel portion 312 when the sliding member is positioned between and engages the grooves 312a, 316b, whereby the sliding engagement of wheel portion 312 relative to the hub portion 314 is made between the sliding member or ring 317 and inner insert or ring 316a, in order to limit or substantially preclude binding of the components as they rotate relative to one another. Optionally, as discussed above, the sliding member or ring portion 317 may comprise a metallic material, and may be coated with a low friction coating or the like, while the inner insert or ring or rings 316a may comprise a plastic or polymeric material, such as a low friction thermoplastic material or the like, to enhance rolling of wheel portion 312 about hub portion 314.

Figure 7:
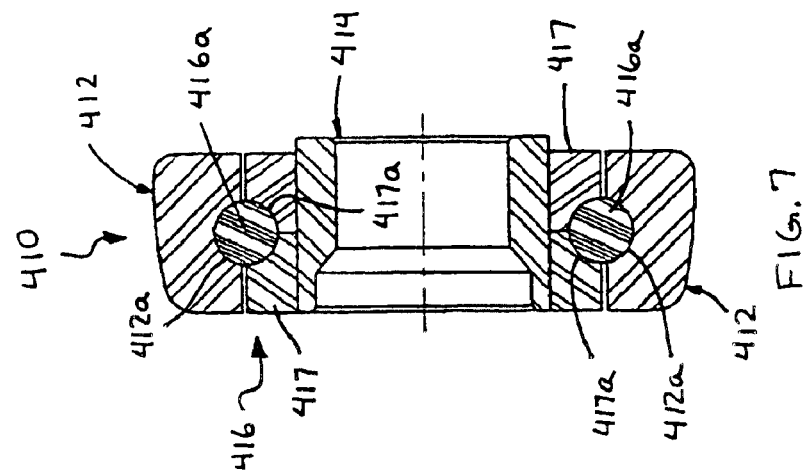
FIG. 7 is a centerline sectional view of another trolley wheel assembly in accordance with the present invention.

Referring now to FIG. 7, a trolley wheel assembly 410 in accordance with the present invention includes a metal or steel wheel portion 412, a metal or steel hub portion 414 and a journal bearing assembly 416 sandwiched between the wheel portion 412 and hub portion 414. The journal bearing assembly 416 is substantially similar in design to journal bearing assembly 316 discussed above, except that the metallic and plastic components are reversed. More particularly, the metallic ring portion 417 of journal bearing assembly 416 of FIG. 7 comprises an inner metal ring or rings around hub portion 414, while the plastic ring portion 416a comprises a generally toroidal-shaped plastic ring having a generally circular or rounded cross section. The plastic ring portion 416a is positioned circumferentially around the metal ring 417 and within an inner groove 417a of ring 417, similar to journal bearing assembly 316 discussed above. A radially outwardly protruding portion or uneven mating surface of ring 416a engages or is received in and along an outer groove 412a formed circumferentially around an inner mating surface of wheel portion 412. The sliding engagement may thus be provided between plastic ring 416a and metallic ring 417 and/or wheel portion 412 as wheel portion 412 rotates about hub portion 414. Optionally, the wheel portion 412, or at least the inner mating surface 412a of wheel portion 412, may be coated with a low friction coating or the like, while the outer mating surface (at least along groove 417a) of the metal ring 417 may likewise be coated with a low friction coating or the like.

Figure 8:
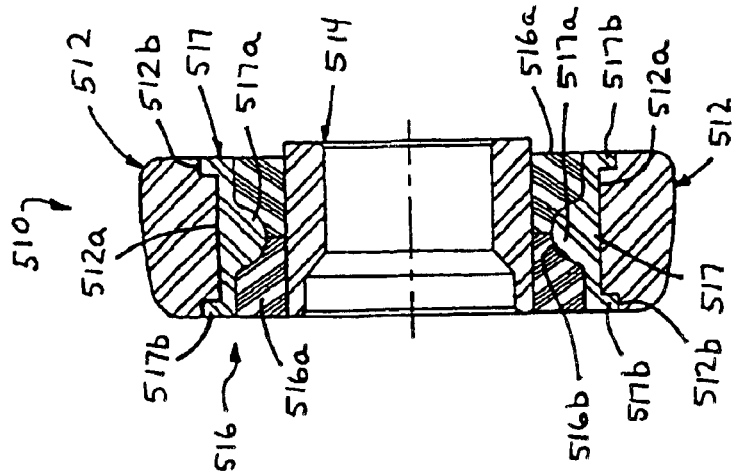
FIG. 8 is a centerline sectional view of another trolley wheel assembly in accordance with the present invention.

Referring now to FIG. 8, a trolley wheel assembly 510 in accordance with the present invention includes a metal or steel wheel portion 512, a metal or steel hub portion 514 and a sliding assembly or journal bearing assembly 516 positioned or sandwiched between the wheel portion 512 and hub portion 514. The journal bearing assembly 516 includes a radially inwardly positioned ring or insert or sliding member 516a (or two inserts to ease assembly of journal bearing assembly 516 and wheel assembly 510, as discussed above) and a radially outwardly positioned sliding member or ring or insert 517. Sliding member or insert 517 includes a radially inwardly projecting or protruding portion, such as a curved or rounded ridge or ring 517a, on and around its mating surface, which mates or engages within a correspondingly formed radially protruding portion or curved or rounded groove or channel 516b in and around the mating surface of the insert 516a, in order to retain the sliding member or insert 517 around the insert 516a and to maintain smooth operation of the wheel assembly during axial thrust and/or radial loading conditions.

Wheel portion 512 may be retained relative to sliding member 517 within and between a pair of flanges 517b extending radially outwardly from sliding member 517 and into generally correspondingly formed recessed portions or channels 512b along the mating surface 512a of wheel portion 512. Sliding member 517 may be generally fixedly mounted to wheel portion 512 (such as adhered, bonded, press fit or otherwise secured to the wheel portion), while the sliding engagement is provided between sliding member 517 and insert 516a, which may likewise be generally fixedly mounted to hub portion 514. Optionally, sliding member 517 may comprise a metallic material and the radially inward mating surface of sliding member 517 may be coated with a low friction coating or the like, as discussed above, to enhance sliding between the metallic sliding member 517 and a plastic or polymeric insert 516a of journal bearing 516. Optionally, the sliding member or insert 517 and/or the inner insert 516a may comprise other suitable materials, such as a low friction thermoplastic material or the like, such as discussed above, to further enhance sliding between the sliding members or inserts of the sliding assembly or journal bearing.

Figure 9:
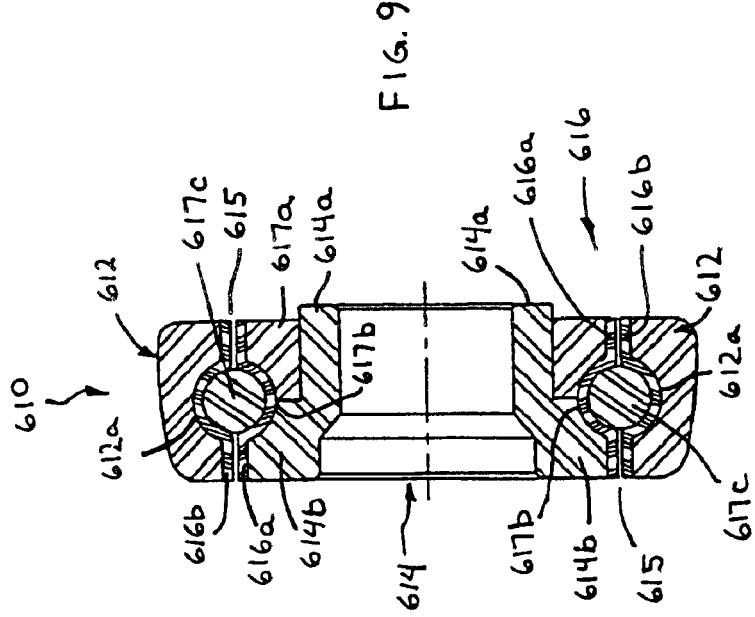
FIG. 9 is a centerline sectional view of another trolley wheel assembly in accordance with the present invention.

Referring now to FIG. 9, a trolley wheel assembly 610 in accordance with the present invention includes a metal or steel wheel portion 612, a metal or steel hub portion 614 and a sliding assembly or journal bearing assembly 616 positioned between the wheel portion 612 and hub portion 614. Hub portion 614 includes a center portion 614a and a radially raised portion 614b, which extends radially outwardly from one end of center portion 614a and forms part of the journal bearing assembly 616, as discussed below. Journal bearing assembly 616 includes an inner ring portion or insert 617a positioned around the center portion 614a of hub portion 614 and abutted against the raised hub portion 614b. Raised hub portion 614b and inner ring portion 617a combine to form or define a channel or groove or radial protrusion or recess 617b circumferentially around hub portion 614.

Journal bearing assembly 616 further includes an inner curved insert or spacer or sliding member 616a and an outer curved insert or spacer or sliding member 616b, which may be oppositely curved to define a generally circular passageway or ring-shaped passageway therebetween. A generally toroidal-shaped (or otherwise generally rounded or curved) ring portion or sliding member 617c may be positioned in and along the generally circular or rounded passageway defined between the inserts 616a, 616b. The ring 617c and correspondingly formed inserts 616a, 616b are partially received within a corresponding groove 612a formed in wheel portion 612 and in the corresponding groove 617b formed at the junction of the raised hub portion 614b and inner ring portion 617a. The ring 617c and inserts 616a, 616b may be sized so that a gap 615 exists between the inserts 616a, 616b when the ring 617c is positioned between the inserts 616a, 616b and within the rounded passageway defined therebetween. The sliding engagement or interface between the wheel portion and the hub portion thus may be made between the mating surface or surfaces of the ring 617c and the mating surfaces defined along the grooves or channels around the inserts or spacers 616a, 616b.

Optionally, ring 617c may comprise a metallic material and may be coated with a low friction coating or like to enhance sliding movement of metal ring 617c relative to inner insert 616a and outer insert 616b, which may comprise a plastic or polymeric material, such as a low friction thermoplastic material or the like, such as discussed above. Optionally, rings or portions 617a, 617c and/or inserts or spacers 616a, 616b and/or hub portion 614 may comprise other suitable materials, such as metallic materials, plastic or polymeric materials, such as a low friction thermoplastic material, ceramic materials, fluorocarbon materials and/or the like, as discussed above, without affecting the scope of the present invention, in order to enhance smooth movement or rotation of wheel portion 612 relative to hub portion 614 of wheel assembly 610.

Figure 10:
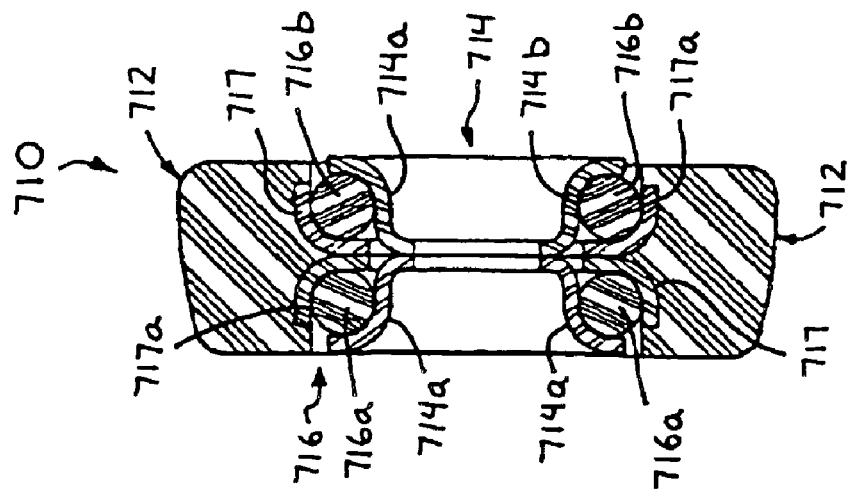
FIG. 10 is a centerline sectional view of another trolley wheel assembly in accordance with the present invention.

Referring now to FIG. 10, a trolley wheel assembly 710 in accordance with the present invention includes a wheel portion 712 and a hub portion 714, with a sliding assembly journal bearing assembly 716 positioned or sandwiched between wheel portion 712 and hub portion 714. Hub portion 714 may comprise a metallic material and may comprise a pair of outwardly turned or curved or radially protruding inner metallic portions 714a extending radially outwardly from hub portion 714. As can be seen in FIG. 10, the radially protruding portions 714a partially define a pair of partial circular or rounded or curved tracks or passageways or channels around the hub portion 714 for receiving a pair of ring portions or sliding members 716a, 716b of journal bearing assembly 716. Journal bearing assembly 716 further includes an outer portion or sliding member or spacer 717, which defines an outer portion of the circular or curved passageways for the plastic rings 716a, 716b. Rings 716a, 716b may be generally toroidal-shaped and may have a generally circular or otherwise rounded or uneven or radially protruding cross section. The rings 716a, 716b and spacer 717 and hub portion 714 thus may cooperate to provide for smooth rolling operation of the wheel assembly 710 during radial and/or axial thrust or loading conditions via sliding engagement in and along the channels of the portions 714a and 717.

The outer portions 717 of journal bearing 716 may be generally fixedly mounted or secured to wheel portion 712.

Optionally, the inner hub portions 714a and the outer wheel portions 717 may comprise a metallic material. The outer mating surfaces 714b of the inner hub portions 714a may be coated with a low friction coating or the like, while the inner mating surfaces 717a of the outer portions 717 may likewise be coated with a low friction coating or the like. The rings 716a, 716b may comprise a plastic or polymeric material, such as a low friction thermoplastic material or the like, to enhance sliding movement between the rings 716a, 716b and the inner metallic hub portions 714a and the outer metallic portions 717. Optionally, the inner and outer portions 714a, 717 and/or the rings 716a, 716b may comprise other suitable materials, such as metallic materials, plastic or polymeric materials, such as a low friction thermoplastic material, ceramic materials, fluorocarbon materials and/or the like, as discussed above, without affecting the scope of the present invention, so as to enhance sliding movement of the ring portions 716a, 716b relative to inner hub portions 714a and outer portions 717 and wheel portion 712.

Although each embodiment described above and shown in the drawings is shown and described as having particular plastic components and metallic components, these embodiments are for illustrative purposes only. The various exemplary sliding members or inserts or portions or rings of the various embodiments may comprise any suitable materials, such as steel or other metallic materials, plastic or polymeric materials, such as a low friction thermoplastic material, ceramic materials, fluorocarbon materials and/or the like, without affecting the scope of the present invention. Optionally, one or more of the inserts, rings or portions and/or the hub or wheel portions of the wheel assemblies may be coated with a low friction coating or material or the like, without affecting the scope of the present invention. Also, although specific embodiments and shapes are shown and described above, clearly other shapes, forms and arrangements of a sliding member and wheel and hub portions may be implemented without affecting the scope of the present invention.

Therefore, the present invention provides for a bearingless trolley wheel assembly which provides for enhanced rotation of the wheel portion of the trolley wheel assembly relative to the hub portion. The bearingless trolley wheel assemblies of the present invention provide for a low friction interface between the wheel portion and the hub portion to facilitate smooth rolling of the wheel portion relative to the hub portion without bearings or lubricants being required. The generally circular or partially circular or otherwise rounded or radially protruding or axially curved mating surfaces of the members or inserts or rings and the correspondingly formed channels or grooves or radial protrusions or axial curves of the other inserts or hub portion or wheel portion provide generally uniform engagement of the sliding components and thus provide smooth rolling operation of the wheel assembly during axial thrust and/or radial loading of the wheel assembly. The rounded or axially uneven inserts or sliding members thus limit or substantially preclude binding of the components, while also obviating the need for thrust washers or the like at the end or ends of the wheel assembly.

The selected materials of the journal bearing assemblies of the present invention provide for an enhanced, low friction interface between the components and further may be substantially resistant to many solutions which may breakdown lubricants of conventional bearings. The preferred plastic material is able to withstand high temperatures, so as to be suitable for use in various environments which may surround a trolley assembly. Also, the bearingless trolley wheel assemblies of the present invention may not require lubricant between the plastic and metal components, particularly when the metal components are coated with the low friction coating or the like, such that the wheel assemblies are particularly suitable for use in paint processing stations and the like, where lubricants from conventional bearings may contaminate the paint processes.

Changes and modifications in the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. A trolley wheel assembly for a conveyor trolley comprising:
   a hub portion;
   a wheel portion rotatably positioned around said hub portion; and
   at least one sliding member positioned between said wheel portion and said hub portion, said sliding member defining at least one mating surface for mating with a generally correspondingly formed mating surface of at least one of said wheel portion and said hub portion, said mating surface of said sliding member defining a radial projection at least substantially circumferentially around said sliding member, said radial projection being positioned inward of the ends of said wheel portion and said hub portion, said mating surface of said at least one of said wheel portion and said hub portion substantially encompassing said radial projection of said sliding member, said radial projection slidably mating with said generally correspondingly formed mating surface of said at least one of said wheel portion and said hub portion to facilitate rotation of said wheel portion about said hub portion.

2. The trolley wheel assembly of claim 1, wherein said radial projection comprises a longitudinally curved radial projection which mates with a correspondingly curved mating surface of said at least one of said wheel portion and said hub portion.

3. The trolley wheel assembly of claim 1, wherein said radial projection projects radially outward, said wheel portion having said correspondingly formed mating surface.

4. The trolley wheel assembly of claim 1, wherein said radial projection projects radially inward, said hub portion having said correspondingly formed mating surface.

5. The trolley wheel assembly of claim 1, wherein said radial projection of said sliding member projects radially inward and radially outward, said correspondingly formed mating surface comprising correspondingly formed mating surfaces defined at said wheel portion and at said hub portion.

6. The trolley wheel assembly of claim 1, wherein said sliding member and said at least one of said wheel portion and said hub portion are correspondingly formed to maintain axial alignment of said sliding member and said at least one of said wheel portion and said hub portion.

7. The trolley wheel assembly of claim 1, wherein said at least one of said wheel portion and said hub portion comprises at least one insert portion, said at least one insert portion defining said correspondingly formed mating surface of said at least one of said wheel portion and said hub portion.

8. The trolley wheel assembly of claim 7, wherein one of said sliding member and said at least one insert member comprise a polymeric material.

9. The trolley wheel assembly of claim 8, wherein the other of said at least one of said sliding member and said at least one insert member comprises a metallic material having a low friction coating thereon.

10. The trolley wheel assembly of claim 7, wherein said sliding member and said at least one insert member are correspondingly formed to maintain axial alignment of said sliding member and said at least one insert member and of said wheel portion and said hub portion.

11. The trolley wheel assembly of claim 1, wherein said at least one sliding member comprises at least one of a metallic material, a polymeric material, an engineered thermoplastic material, a ceramic material and a fluorocarbon material.

12. A trolley wheel assembly for a conveyor trolley comprising:
   a hub portion:
   a wheel portion rotatably positioned around said hub portion; and
   at least one sliding member positioned between said wheel portion and said hub portion, said sliding member defining at least one mating surface for mating with a generally correspondingly formed mating surface of at least one of said wheel portion and said hub portion, said mating surface of said sliding member defining a radial projection at least substantially circumferentially around said sliding member, said radial projection slidably mating with said generally correspondingly formed mating surface of said at least one of said wheel portion and said hub portion to facilitate rotation of said wheel portion about said hub portion, said at least one of said wheel portion and said hub portion comprising at least one insert portion, said at least one insert portion defining said correspondingly formed mating surface of said at least one of said wheel portion and said hub portion, wherein said at least one insert comprises two opposite end insert portions, said two end insert portions together defining said correspondingly formed mating surface.

13. A trolley wheel assembly for a conveyor trolley comprising:
   a hub portion;
   a wheel portion rotatably positioned around said hub portion; and
   at least one sliding member positioned between said wheel portion and said hub portion, said sliding member defining at least one mating surface for mating with a generally correspondingly formed mating surface of at least one of said wheel portion and said hub portion, said mating surface of said sliding member defining a radial projection at least substantially circumferentially around said sliding member, said radial projection slidably mating with said generally correspondingly formed mating surface of said at least one of said wheel portion and said hub portion to facilitate rotation of said wheel portion about said hub portion, said at least one of said wheel portion and said hub portion comprising at least one insert portion, said at least one insert portion defining said correspondingly formed mating surface of said at least one of said wheel portion and said hub portion, wherein said wheel portion comprises at least one wheel insert portion and said hub portion comprises at least one hub insert portion, said at least one wheel insert portion defining an outer correspondingly formed mating surface and said at least one hub insert portion defining an inner correspondingly formed mating surface.

14. A trolley wheel assembly for a conveyor trolley comprising:
   a hub portion;
   a wheel portion rotatably positioned around said hub portion; and
   at least one sliding member positioned between said wheel portion and said hub portion, said at least one sliding member comprising at least one ring-shaped portion having a longitudinally arcuate first mating surface between said wheel portion and said hub portion, said at least one sliding member being positioned between said wheel portion and said hub portion and said first mating surface slidably engaging a generally correspondingly formed longitudinally arcuate second mating surface of at least one of said hub portion, said wheel portion and another sliding member.

15. The trolley wheel assembly of claim 14, wherein said at least one sliding member comprises at least one polymeric sliding member.

16. The trolley wheel assembly of claim 15, wherein said at least one polymeric sliding member comprises an engineered thermoplastic material which provides a low coefficient of friction between said at least one sliding member and said at least one of said hub portion, said wheel portion and another sliding member.

17. The trolley wheel assembly of claim 15, wherein said second mating surface is defined on another sliding member, said other sliding member comprising a metallic sliding member positioned between said at least one polymeric sliding member and at least one of said wheel portion and said hub portion.

18. The trolley wheel assembly of claim 17, wherein said metallic sliding member is coated with a low coefficient of friction or slick coating to enhance sliding movement of said metallic sliding member relative to said at least one polymeric sliding member.

19. The trolley wheel assembly of claim 14, wherein said at least one sliding member comprises at least one of a metallic material, a polymeric material, an engineered thermoplastic material, a ceramic material and a fluorocarbon material.

20. A trolley wheel assembly for a conveyor trolley comprising:
   a hub portion;
   a wheel portion rotatably positioned around said hub portion; and
   at least one sliding member positioned between said wheel portion and said hub portion, said at least one sliding member comprising at least one ring-shaped portion having an uneven first mating surface between said wheel portion and said hub portion, said at least one sliding member being positioned between said wheel portion and said hub portion and said uneven first mating surface slidably engaging a generally correspondingly formed uneven second mating surface of another sliding member.

21. The trolley wheel assembly of claim 20, wherein said at least one sliding member comprises a metallic portion and said other sliding member comprises a polymeric portion, said metallic portion slidably engaging said polymeric portion as said wheel portion rotates about said hub portion.

22. The trolley wheel assembly of claim 21, wherein said polymeric portion and said metallic portion are correspondingly formed to maintain axial alignment of said polymeric portion and said metallic portion and of said wheel portion and said hub portion.

23. The trolley wheel assembly of claim 21, wherein said metallic portion is coated with a low coefficient of friction or slick coating to enhance sliding movement of said metallic portion relative to said polymeric portion.

24. The trolley wheel assembly of claim 21, wherein said polymeric portion comprises an inner polymeric portion and an outer polymeric portion, whereby said inner polymeric portion is positioned adjacent to and in engagement with said hub portion, while said outer polymeric portion is positioned adjacent to and in engagement with said wheel portion, said metallic portion being generally sandwiched between said inner and outer polymeric portions.

25. The trolley wheel assembly of claim 24, wherein said metallic portion comprises a metallic ring having said uneven first mating surface and being positioned between said inner polymeric portion and said outer polymeric portion and in slidable engagement with at least one of said inner and outer polymeric portions.

26. The trolley wheel assembly of claim 21, wherein said polymeric portion is positioned adjacent to said hub portion and said metallic portion is positioned adjacent to said wheel portion and in slidable engagement with said polymeric portion to facilitate rotation of said wheel portion about said hub portion.

27. The trolley wheel assembly of claim 21, wherein said metallic portion is positioned adjacent to said hub portion and said polymeric portion is positioned adjacent to said wheel portion and in slidable engagement with said metallic portion to facilitate rotation of said wheel portion about said hub portion.

28. A trolley wheel assembly for a conveyor trolley comprising:
  a hub portion;
  a wheel portion rotatably positioned around said hub portion; and
  a sliding assembly positioned between said wheel portion and said hub portion, said sliding assembly providing for rotation of said wheel portion relative to said hub portion, said sliding assembly comprising first and second sliding members having a sliding interface, said first and second sliding members being generally correspondingly formed at said sliding interface and defining generally corresponding radial projections at said sliding interface to limit axial movement between said first and second sliding members, said first and second sliding members slidably engaging one another at said sliding interface.

29. The trolley wheel assembly of claim 28, wherein said first sliding member comprises a polymeric portion and said second sliding member comprises a metallic portion.

30. The trolley wheel assembly of claim 29, wherein said second sliding member is coated with a low coefficient of friction or slick coating to enhance sliding movement between said first and second sliding members.

31. The trolley wheel assembly of claim 28, wherein said first sliding member is positioned adjacent to and in engagement with one of said hub portion and said wheel portion, said trolley wheel assembly comprising a third sliding member positioned adjacent to and in engagement with the other of said hub portion and said wheel portion, said second sliding member being positioned between said first and third sliding members.

32. The trolley wheel assembly of claim 31, wherein said second sliding member comprises a ring-shaped member positioned between said first and third sliding members and in slidable engagement with at least one of said first and third sliding members.

33. The trolley wheel assembly of claim 32, wherein said ring-shaped member comprises a generally toroidal-shaped ring.

34. The trolley wheel assembly of claim 28, wherein said first sliding member comprises a two piece member positioned at one of said wheel portion and said hub portion, said two piece member comprising opposite end members positioned toward opposite axial ends of said wheel assembly, said opposite end members and said second sliding member cooperating to define said sliding interface.

35. The trolley wheel assembly of claim 28, wherein said first sliding member is positioned adjacent to said hub portion and said second sliding member is positioned adjacent to said wheel portion.

36. The trolley wheel assembly of claim 35, wherein said first sliding member is generally affixed to said hub portion and said second sliding member is generally affixed to said wheel portion.

37. The trolley wheel assembly of claim 28, wherein said first sliding member comprises at least one of a metallic material, a polymeric material, an engineered thermoplastic material, a fluorocarbon material and a ceramic material.

38. The trolley wheel assembly of claim 28, wherein said second sliding member comprises at least one of a metallic material, a polymeric material, an engineered thermoplastic material, a fluorocarbon material and a ceramic material.

* * * * *

UNITED STATES PATENT AND TRADEMARK OFFICE
CERTIFICATE OF CORRECTION

PATENT NO. : 6,880,469 B2
APPLICATION NO. : 10/723970
DATED : April 19, 2005
INVENTOR(S) : Charles C. Frost It is certified that error appears in the above-identified patent and that said Letters Patent is hereby corrected as shown below:

Column 13
Line 17, "portion:" should be --portion;--

Signed and Sealed this

Third Day of February, 2009

JOHN DOLL
*Acting Director of the United States Patent and Trademark Office*